US010921539B2

United States Patent
Brown

(10) Patent No.: US 10,921,539 B2
(45) Date of Patent: Feb. 16, 2021

(54) OPTICAL FIBER THAT PROVIDES AN INDICATION THAT BREAKAGE IS IMMINENT, AND METHOD OF MANUFACTURING SUCH AS FIBER

(71) Applicant: Joe Denton Brown, Panama City Beach, FL (US)

(72) Inventor: Joe Denton Brown, Panama City Beach, FL (US)

( * ) Notice: Subject to any disclaimer, the term of this patent is extended or adjusted under 35 U.S.C. 154(b) by 542 days.

(21) Appl. No.: 14/811,127

(22) Filed: Jul. 28, 2015

(65) Prior Publication Data
US 2016/0187608 A1 Jun. 30, 2016

Related U.S. Application Data

(60) Provisional application No. 62/029,635, filed on Jul. 28, 2014.

(51) Int. Cl.
| *G02B 6/44* | (2006.01) |
| *G01M 11/00* | (2006.01) |
| *G02B 6/02* | (2006.01) |
| G02B 6/14 | (2006.01) |
| F21V 8/00 | (2006.01) |

(52) U.S. Cl.
CPC ........... *G02B 6/4469* (2013.01); *G01M 11/37* (2013.01); *G02B 6/02395* (2013.01); *G02B 6/0003* (2013.01); *G02B 6/14* (2013.01)

(58) Field of Classification Search
CPC ......... F21V 8/00; G01M 11/37; G01M 11/00; G02B 6/0003; G02B 6/02395; G02B 6/036; G02B 6/4469; G02B 6/02; G02B 6/44
See application file for complete search history.

(56) References Cited

U.S. PATENT DOCUMENTS

| 6,798,956 | B2 * | 9/2004 | Morrison | G02B 6/447 385/100 |
| 7,006,741 | B1 * | 2/2006 | Yu | G02B 6/06 385/116 |
| 7,356,228 | B1 * | 4/2008 | Berens | G02B 6/001 356/73.1 |
| 2004/0146254 | A1 * | 7/2004 | Morrison | G02B 6/447 385/100 |
| 2004/0170371 | A1 * | 9/2004 | Arkhipov | G02B 6/02033 385/141 |
| 2008/0170221 | A1 * | 7/2008 | Berens | G02B 6/4402 356/73.1 |
| 2013/0218147 | A1 | 8/2013 | Brown | |
| 2015/0360046 | A1 | 12/2015 | Brown | |
| 2016/0187608 | A1 * | 6/2016 | Brown | G02B 6/036 356/73.1 |

FOREIGN PATENT DOCUMENTS

| WO | WO2013/012986 A1 | 1/2013 | |
| WO | WO 2016018884 A1 * | 2/2016 | ............ G02B 6/036 |

* cited by examiner

*Primary Examiner* — Andrew Jordan
(74) *Attorney, Agent, or Firm* — Bacon & Thomas, PLLC

(57) ABSTRACT

An optical fiber includes an integrated detector in the form of phosphors that emit light of a characteristic frequency or wavelength in response to leakage, through the fiber cladding, of light having an interrogation wavelength λ1. Stimulation of phosphor emission by the interrogation light is indicative of aging or wear on the layers surrounding the cladding, and therefore can be used to assess the risk of imminent breakage of the fiber.

4 Claims, 1 Drawing Sheet

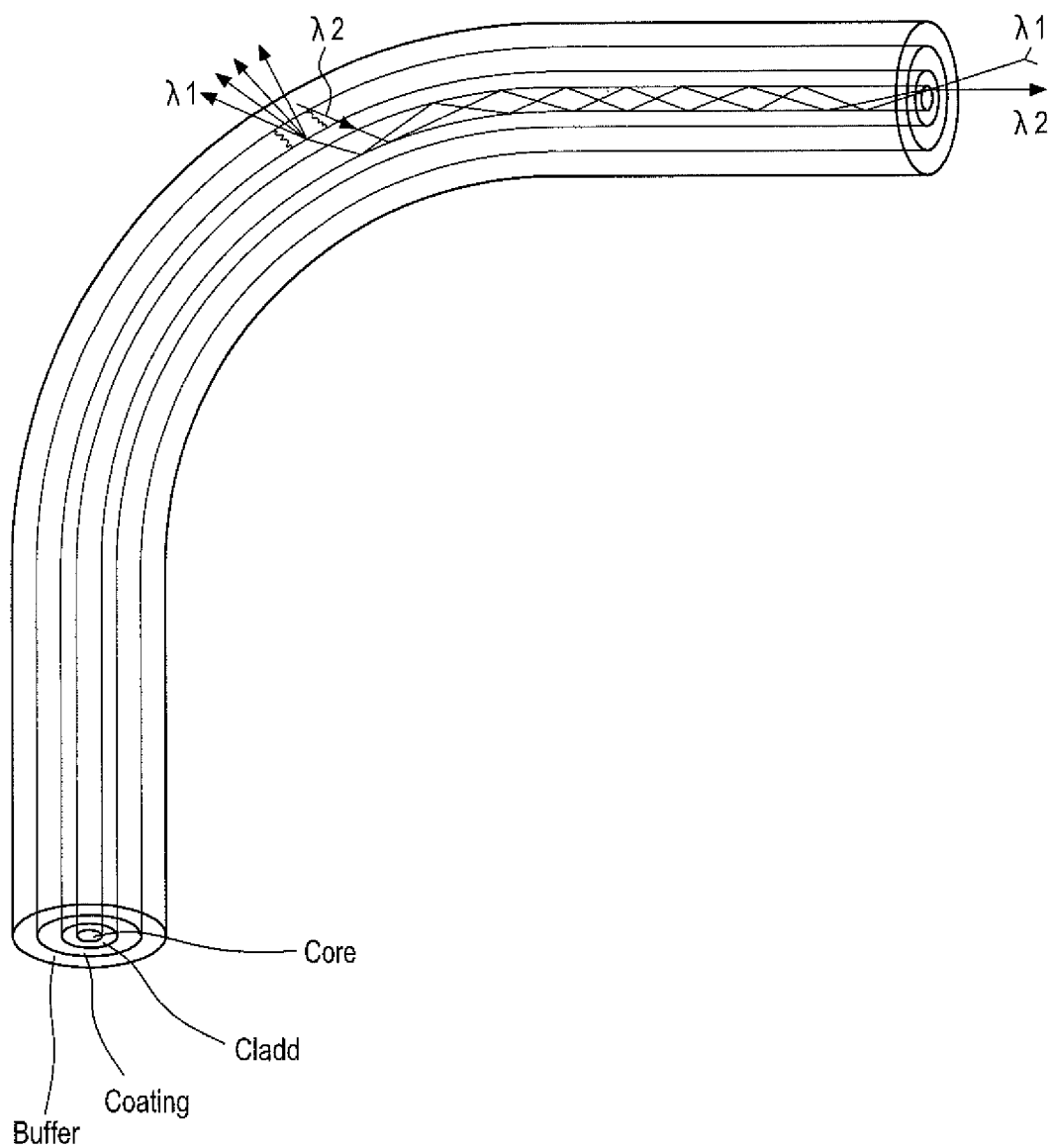

OPTICAL FIBER THAT PROVIDES AN INDICATION THAT BREAKAGE IS IMMINENT, AND METHOD OF MANUFACTURING SUCH AS FIBER

This application claims the benefit of U.S. Provisional Patent Appl. Ser. No. 62/029,635 filed Jul. 28, 2014, and incorporated by reference herein.

BACKGROUND OF THE INVENTION

1. Field of the Invention

This invention relates to optical fibers, and in particular to detection of coating degradation that presents a risk of imminent breakage.

The invention also relates to a method of manufacturing optical fibers to enable detection of coating degradation, and to a method of detecting the coating degradation.

The optical fibers may include optical fibers of the type used to deliver therapeutic laser energy during surgical procedures. to a method of manufacturing optical fibers, and to a method of detecting imminent breakage.

2. Description of Related Art

A. Proposals to Reuse Surgical Laser Optical Fibers

In order to reduce health care costs, it has been proposed to sterilize and reuse surgical laser optical fibers. The savings achieved by reusing the optical fibers, rather than using a new fiber for each procedure, can amount to hundreds of thousands of dollars per year for a single hospital. However, such reuse of the fibers by hospitals and doctors has been limited because it is currently impractical or impossible to predict when a reused fiber will break as a result of damage caused by leakage of laser energy into the layers that surround the fiber core and cladding. While numerous feedback arrangements exist for detecting overheating at the treatment site, the conventional arrangements do not predict fiber breakage resulting from degradation and weakening of the layers surrounding the fiber cladding during normal use of the fiber. Instead, such breakage tends to occur without warning, necessitating replacement of the fibers more frequently than would be the case if a reliable way to predict imminent breakage were available.

B. Single-Use Fibers

The problem of predicting imminent breakage also applies to single-use fibers. For example, if a laser is misaligned during a treatment procedure, excess energy can enter the cladding and cause damage to layers surrounding the cladding, leading to sudden fiber breakage. If the fiber is deflected during the procedure, the problem of damage to layers surrounding the cladding may be exacerbated, increasing the possibility of sudden breakage. This is a safety issue that would be overcome if there were a reliable way to detect the presence of excess energy in layers surrounding the cladding, and therefore determine the likelihood of imminent breakage of the fiber.

SUMMARY OF THE INVENTION

It is accordingly an objective of the invention to provide a way to assess damage the coatings of an optical fiber and thereby predict breakage of the optical fiber before it occurs.

This objective is achieved, in accordance with principles of a preferred embodiment of the invention, by providing an optical fiber with a built-in detector in the form of phosphors that emit light of a characteristic frequency or wavelength $\lambda 2$ in response to leakage, through the fiber cladding, of light having an interrogation frequency or wavelength $\lambda 1$. Stimulation of phosphor emission by the interrogation light is indicative of aging or wear on the layers surrounding the cladding, and therefore of the risk of imminent breakage of the fiber.

The characteristic wavelength (or wavelengths) emitted by the phosphors may be visible wavelengths, enabling detection of the presence of excess leakage radiation by an operator without the need for detection electronics. In addition, or alternatively, the characteristic wavelengths emitted by the phosphors, or multiple different phosphors, may include wavelengths, characteristic patterns, or signatures that are only detectable by a sensor and sensor electronics. The phosphors may be provided as part of a separate coating surrounding the cladding or layers of the buffer, or may be incorporated into the material of the buffer.

The above-described objective of the invention is also achieved, in accordance with principles of another preferred embodiment of the invention, by a method of making an optical fiber that includes the steps of applying a phosphor coating to the cladding or to a buffer layer of the optical fiber, and/or the steps of incorporating phosphors into a buffer layers or layers surrounding the fiber cladding, the applied or incorporated phosphors emitting light of a characteristic frequency or wavelength in response to leakage, through the fiber cladding, of an interrogation beam, i.e., of light having an interrogation wavelength capable of stimulating emission of light by the phosphors.

The above-described objective of the invention is also achieved, in accordance with principles of another preferred embodiment of the invention, by a method of assessing or detecting damage to coatings of an optical fiber, and therefore of predicting the risk of imminent breakage, that includes the steps of introducing into the optical fiber an interrogation beam, or light having an interrogation wavelength $\lambda 1$, and detecting damage to the fiber by detecting emissions of wavelength $\lambda 2$ that result from stimulation of the phosphors whenever excess leakage of the interrogation beam from the fiber core through the fiber cladding occurs.

Although the invention is especially suitable for surgical laser optical fibers, it will be appreciated that the coating-wear or damage detection provided by the invention may have applicability to optical fibers in contexts other than laser surgery.

In addition, the principles of the present invention may be applied to systems that already include feedback from the target or treatment site, including the systems disclosed in the Inventor's PCT Publication No. 2013/012986 and U.S. Patent Publication No. 2013/0218147, incorporated herein by reference, which disclose therapeutic laser systems that use stimulated emission or reflected feedback signals having a characteristic pattern or signature to enhance the detectability of the feedback signals, and the Inventor's U.S. Provisional Patent Appl. Ser. No. 62/011,747, filed Jun. 13, 2014, and also incorporated herein by reference, which teaches modulation of a therapeutic laser aiming or reference beam for use as a feedback signal.

BRIEF DESCRIPTION OF THE DRAWINGS

FIG. 1 is a schematic illustration of an optical fiber having a damage-detecting, breakage-predicting phosphor layer in accordance with the principles of a preferred embodiment of the invention.

DETAILED DESCRIPTION OF THE PREFERRED EMBODIMENTS

As shown in FIG. 1, an optical fiber includes a core, a cladding, and a buffer layer. The core, cladding, and buffer layer may be conventional optical fiber layers, and are well known to those skilled in the art. The core is arranged to carry laser energy that propagates though the core from a laser source at one end of the fiber to a target at a second end of the fiber as a result of internal reflection at the interface between the core and cladding. Although just a single cladding and buffer layer are illustrated, either or both of the cladding and buffer may be made up of multiple layers.

As the optical fiber ages, the layers surrounding the core will degrade or deteriorate. For example, damage to the cladding and buffer layers may occur through a process of carbonization. During a single use, this is not a problem but, over time, the damage will accumulate and cause significant weakening of the fiber, and eventually result in fiber breakage.

In the preferred embodiment illustrated in FIG. 1, a damage or wear detector in the form of a phosphor coating is added between the cladding and buffer layer. The phosphor coating emits light of wavelength $\lambda 2$ in response to stimulus from light of wavelength $\lambda 1$ that has leaked through the damaged cladding. The light of wavelength $\lambda 1$ may be injected into the fiber as an interrogation beam, or may part of or include an aiming beam. In addition, the light of wavelength $\lambda 1$ may be included in the therapeutic laser beam, take the form of a modulated reference or aiming beam of the type disclosed in U.S. Provisional Patent Appl. Ser. No. 62/011,747, and/or have a characteristic signature or pattern as disclosed in PCT Publication No. 2013/012986 and U.S. Patent Publication No. 2013/0218147.

As the coatings or layers surrounding the fiber deteriorate, leakage of light increases, providing an indication of the condition of the coatings or layers, and therefore of the rink of imminent breakage. When light of wavelength $\lambda 1$ is present in the leakage, the phosphors in the phosphor coating are stimulated and emit light of wavelength $\lambda 2$. The resulting light emission from the phosphor coating is visible or detectable to provide a warning that breakage is imminent, and therefore of the need to replace the fiber before any damage occurs.

As illustrated in FIG. 1, at least a portion of the light $\lambda 2$ emitted by the phosphor coating will travel along the fiber for detection or viewing at the input end of the fiber. Alternatively, light emitted to the exterior of the fiber may be viewed through a scope or introducer, or detected by a sensor positioned on an exterior of or outside the fiber. For example, when viewed through a scope, the light emitted by the phosphor may appear as a glow or aura surrounding the fiber and having a color corresponding to wavelength $\lambda 2$. When the glow is seen during testing of the fiber prior to reuse, the operator will have an indication that breakage is imminent.

In order to distinguish phosphor emissions from the primary laser light, the phosphor emissions of wavelength $\lambda 2$ should be distinguishable from the stimulating emission having wavelength $\lambda 1$. As noted above, the light of wavelength $\lambda 1$ may be included in a dedicated interrogation or test beam, an aiming beam, a modulated reference or aiming beam, a feedback signal having a characteristic signature or pattern, or any other light injected or coupled into the fiber. The wavelength $\lambda 2$ of the phosphor emissions may be those of a single color of visible light, or multiple colors emitted by a multiple phosphors having different excitation frequencies or wavelengths.

Those skilled in the art will appreciate that the sensitivity of the phosphor detector may be varied not only by the amount and type of phosphor or phosphors, but also by numerical aperture launch of the interrogation or aiming beam having wavelength $\lambda 1$.

Although depicted as a single coating layer between the cladding and a buffer layer, it will be appreciated that the wear or damage detector in the form of the phosphor coating alternatively take the form of multiple coatings, of one or more coatings between multiple cladding and/or buffer layers, or of phosphors incorporated directly into the cladding and/or buffer layers of the optical fiber.

In addition to providing an optical fiber with a built-in damage or wear detection "detector," the preferred embodiments of the present invention include a method of making such an optical fiber. The method modifies conventional fiber manufacturing methods by adding the step of applying a phosphor coating to the cladding or to a buffer layer of the optical fiber, and/or the steps of incorporating phosphors into a buffer layers or layers surrounding the fiber cladding, the applied or incorporated phosphors emitting light of a characteristic frequency in response to leakage, through the fiber cladding, of light from an interrogation beam.

Still further, the preferred embodiments of the invention include a method of assessing or detecting damage to coatings of an optical fiber, and therefore of predicting the risk of imminent breakage. The damage assessment of detection method of this embodiment includes a first step of introducing light having wavelength $\lambda 1$, and/or a characteristic pattern or signature, into an optical fiber with a built-in damage or wear detector, as described above, and a second step of detecting damage to the fiber by detecting emissions of wavelength $\lambda 2$ that result from stimulation of the phosphors by the light of wavelength $\lambda 1$ if excess leakage of the light of wavelength $\lambda 1$ has occurred.

The second step of the damage or wear detection method of the preferred embodiment may be carried out by visual observation, by sensing light of wavelength $\lambda 2$ using a sensor and corresponding electronics, or by both visual observation and use of a sensor and electronics. In the case of visual observation, when light with characteristics of the stimulated emission from the phosphors appears in the field of view of the operator, for example as a ring surrounding the fiber or aiming beam, then the operator will have a clear indication that breakage is imminent. If enough phosphor is used so as to ensure visibility to an observer, it is possible to eliminate detection electronics, although electronics may still be used as a supplement to visual operation.

On the other hand, if the phosphor emissions are to be detected solely by a sensor or electronics rather than by visual observation, then the emissions may be in a non-visible part of the spectrum, and the amount and location of the phosphors may be adjusted accordingly. In general, the phosphors may be applied incorporated over the entire length of the fiber, or anywhere that is subject to degradation and potential breakage.

Having thus described a preferred embodiment of the invention in connection with the accompanying drawing, it will be appreciated that the invention is not to be limited to the specific embodiments or variations disclosed.

I claim:

1. An optical fiber having a core, at least one cladding layer, and at least one buffer layer, comprising:

a built-in damage or wear detector in the form of phosphors that emit light of a characteristic emission wavelength $\lambda 2$ in response to leakage of light from the core through the at least one cladding layer, said light leaking from the core having an interrogation wavelength $\lambda 1$ and/or a characteristic pattern or signature, wherein stimulation of phosphor emission by the light of interrogation wavelength $\lambda 1$ and/or a characteristic pattern or signature is indicative of aging or wear on layers surrounding the at least one cladding layer, and therefore of the risk of imminent breakage of the fiber, wherein the phosphors are incorporated into a material of said at least one buffer layer.

2. An optical fiber as claimed in claim 1, wherein characteristic emission wavelength $\lambda 2$ is a visible wavelength, enabling detection of the presence of excess leakage radiation by an operator without the need for detection electronics.

3. An optical fiber as claimed in claim 1, wherein characteristic emission wavelength $\lambda 2$ is detectable by a sensor and detection electronics.

4. An optical fiber as claimed in claim 1, wherein said phosphor includes multiple different phosphors having different characteristic emission wavelengths.

\* \* \* \* \*